US012570100B2

(12) United States Patent
Hoshino et al.

(10) Patent No.: US 12,570,100 B2
(45) Date of Patent: Mar. 10, 2026

(54) LIQUID STORING CARTRIDGE AND PRINTER

(71) Applicant: BROTHER KOGYO KABUSHIKI KAISHA, Nagoya (JP)

(72) Inventors: Genki Hoshino, Nagoya (JP); Akinari Ishibe, Okazaki (JP); Yuma Tanabe, Nagoya (JP); Satoru Oki, Nagoya (JP); Sosuke Kuroyanagi, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 146 days.

(21) Appl. No.: 18/192,539

(22) Filed: Mar. 29, 2023

(65) Prior Publication Data

US 2023/0311548 A1 Oct. 5, 2023

(30) Foreign Application Priority Data

Mar. 31, 2022 (JP) ................................ 2022-061268

(51) Int. Cl.
*B41J 29/13* (2006.01)

(52) U.S. Cl.
CPC .................................... *B41J 29/13* (2013.01)

(58) Field of Classification Search
CPC ....................................................... B41J 29/13
See application file for complete search history.

(56) References Cited

U.S. PATENT DOCUMENTS

| | | | |
|---|---|---|---|
| 2004/0218021 A1 | 11/2004 | Ishizawa et al. | |
| 2005/0057622 A1 | 3/2005 | Kimura et al. | |
| 2009/0256892 A1 | 10/2009 | Takeuchi | |
| 2011/0057997 A1 | 3/2011 | Takeuchi | |
| 2017/0087855 A1 | 3/2017 | Takagiwa | |

FOREIGN PATENT DOCUMENTS

| | | | | |
|---|---|---|---|---|
| AU | 2004200945 B2 * | 10/2009 | .......... B41J 2/17506 |
| JP | H05-162333 A | 6/1993 | |
| JP | 2004-284353 A | 10/2004 | |
| JP | 2005-271539 A | 10/2005 | |
| JP | 2009-2553312 A | 11/2009 | |
| JP | 2011-51321 A | 3/2011 | |
| JP | 2017-65152 A | 4/2017 | |

* cited by examiner

*Primary Examiner* — Justin Seo
(74) *Attorney, Agent, or Firm* — Kenealy Vaidya LLP

(57) ABSTRACT

There is provided a liquid storing cartridge for accommodating a liquid container which has a tap. The liquid storing cartridge includes: a case having an opening and a first sidewall; and a cover which is configured to cover at least part of the opening, and which has a second sidewall, the first and second sidewalls defining a sidewall of the liquid storing cartridge in a state that the at least part of the opening is covered by the cover. The first sidewall is configured to support the tap in a state that the liquid container is accommodated in the opening. The cover further has a contact part provided on the second sidewall. The contact part is configured to make contact with the tap in the state that the liquid container is accommodated in the opening and that the at least part of the opening is covered by the cover.

13 Claims, 14 Drawing Sheets

LIQUID STORING CARTRIDGE AND PRINTER

REFERENCE TO RELATED APPLICATIONS

This application claims priority from Japanese Patent Application No. 2022-061268 filed on Mar. 31, 2022. The entire content of the priority application is incorporated herein by reference.

BACKGROUND ART

A cartridge case provided with a first case and a second case which extend in a first direction, is known. The first case is provided on a lower side of the second case, an upper side of the first case is opened, and the first case accommodates a liquid storing body in the inside of the first case. The second case is provided on a location above the first case so as to face the first case, and covers the first case. A tap supporting part which supports a tap of the liquid storing body is provided on one end part in the first direction of the first case.

DESCRIPTION

In Japanese Patent Application Laid-Open No. JP2017-65152, a positioning boss extends in a left-right direction orthogonal to the first direction is provided in a tap. The positioning boss fits into the tap supporting part. In a case that the liquid storing body is attached to the cartridge case, the second case is moved, relative to the first case, in a direction away from the one end part in the first direction so as to cause the first case to accommodate the liquid storing body. The tap of the liquid storing body is inserted into the tap supporting part. Then, the second case is moved in a direction toward the one end part in the first direction of the first case.

In the above-described cartridge case, in a case that the positioning boss or the tap is lifted, there is such a possibility that the tap might be offset or deviated upward from the tap supporting part. In such a case, there is such a possibility that a ink supplying needle provided on a printer might not enter into the tap satisfactorily and that the ink might leak.

An object of the present disclosure is to provide a liquid storing cartridge and a printer each of which is capable of lowering a possibility that a tap of a liquid container might float or rise upward.

A liquid storing cartridge according to a first aspect of the present disclosure is a liquid storing cartridge for accommodating a liquid container which is configured to store a liquid and which has a tap, the liquid storing cartridge including: a case having an opening configured to accommodate the liquid container, and a first sidewall; and a cover which is configured to cover at least part of the opening of the case, and which has a second sidewall, the first sidewall and the second sidewall defining a sidewall of the liquid storing cartridge in a state that the at least part of the opening of the case is covered by the cover. The first sidewall of the case is configured to support the tap in a state that the liquid container is accommodated in the opening. The cover further has a contact part provided on the second sidewall. The contact part is configured to make contact with the tap in the state that the liquid container is accommodated in the opening and that the at least part of the opening is covered by the cover.

According to the first aspect, since the possibility that the tap of the liquid container might float or rise upward is lowered, the position of the tap with respect to the case becomes stable. Accordingly, it is possible to install the tap with respect to a supplying needle, without any deviation in the position of the tap.

A printer according to a second aspect of the present disclosure is a printer including the above-described liquid storing cartridge. According to the second aspect, since the possibility that the tap of the liquid container might float or rise upward is lowered in the printer, the position of the tap with respect to the case becomes stable. Accordingly, it is possible to install the tap with respect to the supplying needle, without any deviation in the position of the tap.

Figure 14:
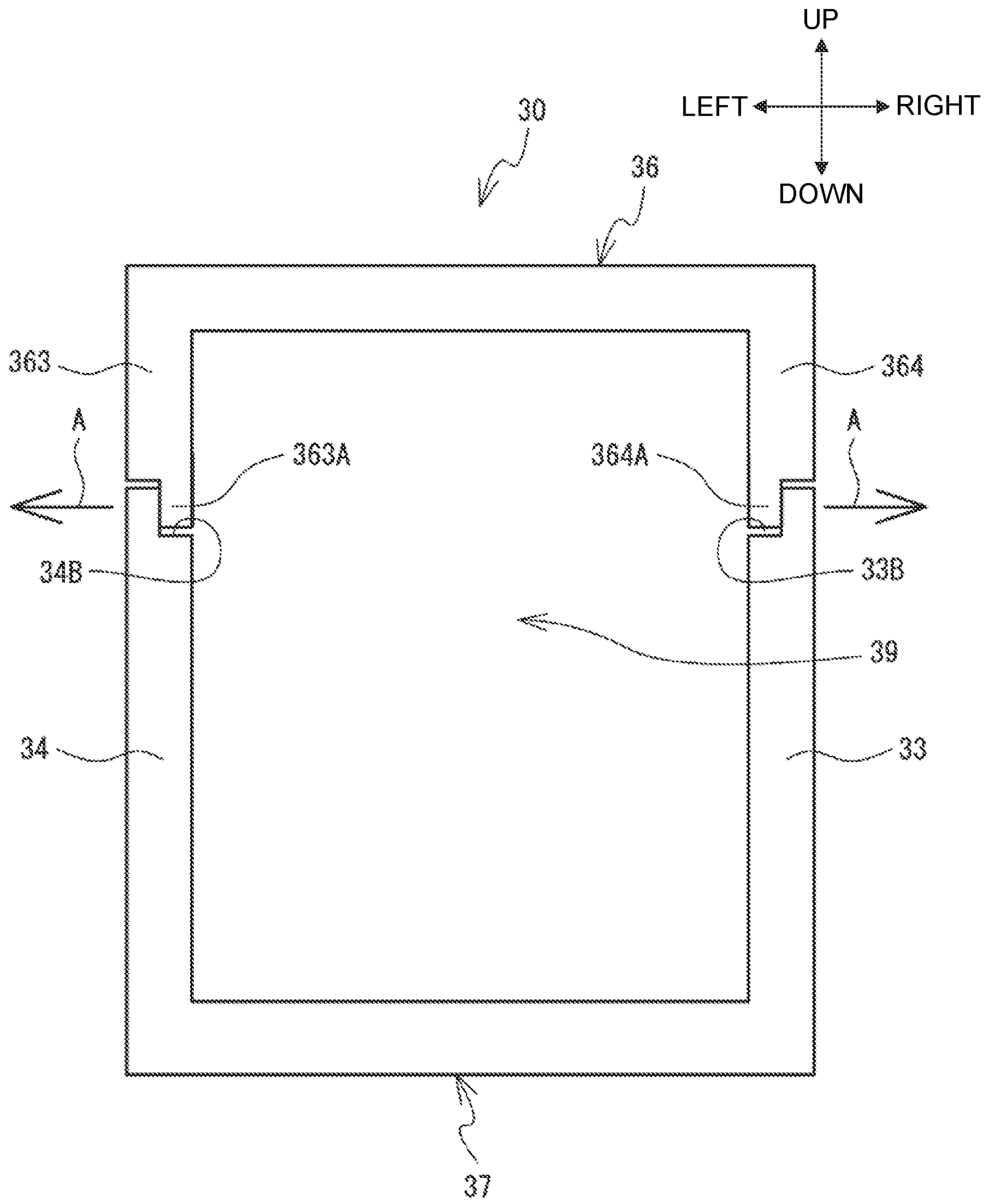

FIG. 14 is a view depicting a state that the cover 36 covers an opening 39 of the lower case 37.

Figure 1:
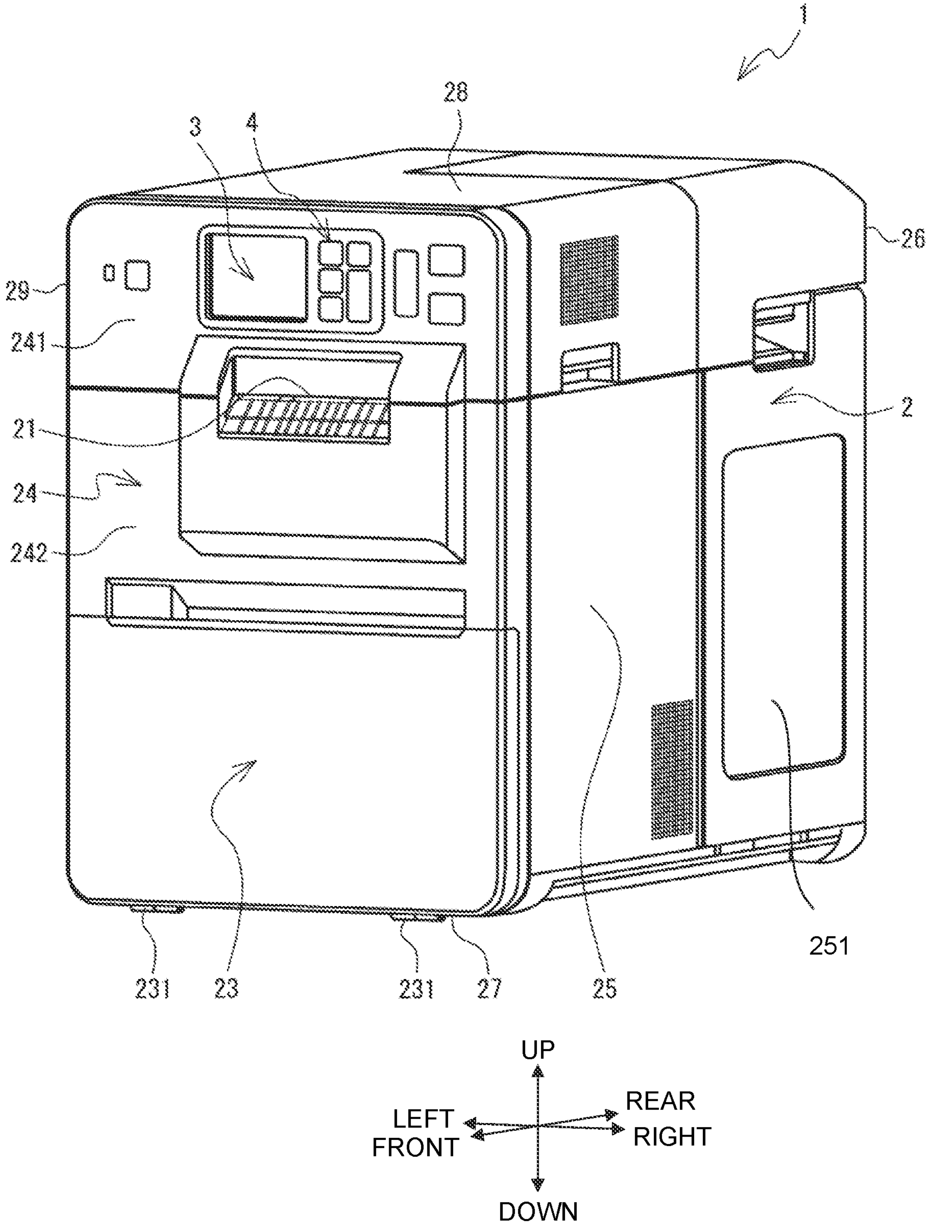
FIG. 1 is a perspective view of a printer 1.

A printer 1 according to an embodiment of the present disclosure will be explained, sequentially with reference to the drawings. In the present embodiment, a mechanical element in the drawings indicates an actual scale in each of the drawings. The drawings which are referred to are used for explaining a technical feature which may be adopted by the present disclosure, and the configuration of an apparatus which is described is not meant to be limited only thereto, and is a mere example for explanation. In the explanation of the present embodiment, a left lower side, a right upper side, a right lower side, a left upper side, an upper side and a lower side of FIG. 1 are, respectively, a front side, a rear side, a right side, a left side, an upper side and a lower side of the printer 1. A left lower side, a right upper side, a right lower side, a left upper side, an upper side and a lower side of FIG. 6 are, respectively, a front side, a rear side, a right side, a left side, a front side, a rear side, an upper side and a lower side of the cartridge 30. FIGS. 1 to 5 are drawings with the directions of the printer 1, whereas FIGS. 6 to 14 are drawings with the directions of the cartridge 30, and the cartridge 30 is installed in the printer 1 in a state that the front surface of the cartridge 30 is oriented to face the rear surface of the printer 1.

<Configuration of Printer 1>

The configuration of the printer 1 will be explained, with reference to FIG. 1. The printer 1 is an ink-jet printer which performs printing on a medium having an elongated shape. In a case that print data is inputted to an input terminal (omitted in the drawings), the printer 1 prints the print data on the medium by a printing mechanism (omitted in the drawings) built in the printer 1, and discharges the medium from a discharge port 21 (to be described later on). As depicted in FIG. 1, the printer 1 is provided with a casing 2. The casing 2 has a shape of rectangular parallelepiped having a size placeable or arrangeable on a table or desk, and has a front wall 24, a right wall 25, a rear wall 26, a left wall 29, a bottom wall 27, an upper wall 28 and a front cover 23.

The front wall 24 is provided on a front surface of the casing 2, and has, from the upper side toward the lower side, a first front wall 241 and a second front wall 242. Each of the first front wall 241 and the second front wall 242 is rectangular which is long in a left-right direction as seen from the front side. The first front wall 241 is provided on an upper part on the front side of the casing 2, and the second front wall 242 is provided at a location which is below the first front wall 241 and which is at the center on the front side of the casing 2. Each of the right wall 25, the rear wall 26 and the left wall 29 is rectangular which is long in an up-down direction. Further, each of the bottom wall 27 and the upper wall 28 is rectangular which is long in a front-rear direction.

The discharge port 21 is provided on a boundary between the first front wall 241 and the second front wall 242. The discharge port 21 is a rectangular opening which is long in the left-right direction as seen from the front side, and discharges a medium having printing performed thereon. The first front wall 241 is provided with a displaying part 3 and an operating part 4. The displaying part 3 displays a letter, an image, etc. The operating part 4 is provided on the right side with respect to the displaying part 3. The operating part 4 is provided with a touch panel or a plurality of buttons via which a variety of kinds of instructions are inputted.

The front cover 23 is provided on the front surface of the casing 2 and below the second front wall 242. The front cover 23 is a rectangular lid as seen from the front side, and is provided with a pair of hinges 231 on a lower end part of the front cover 23. By the pair of hinges 231, the front cover 23 is rotatable to a close position (see FIG. 1) at which the front cover 23 closes an opening part 11 and an opening part 12 of an accommodating part 6, depicted in FIG. 3, and to an open position at which the front cover 23 releases (does not cover) the opening part 11 and the opening part 12.

Figure 2:
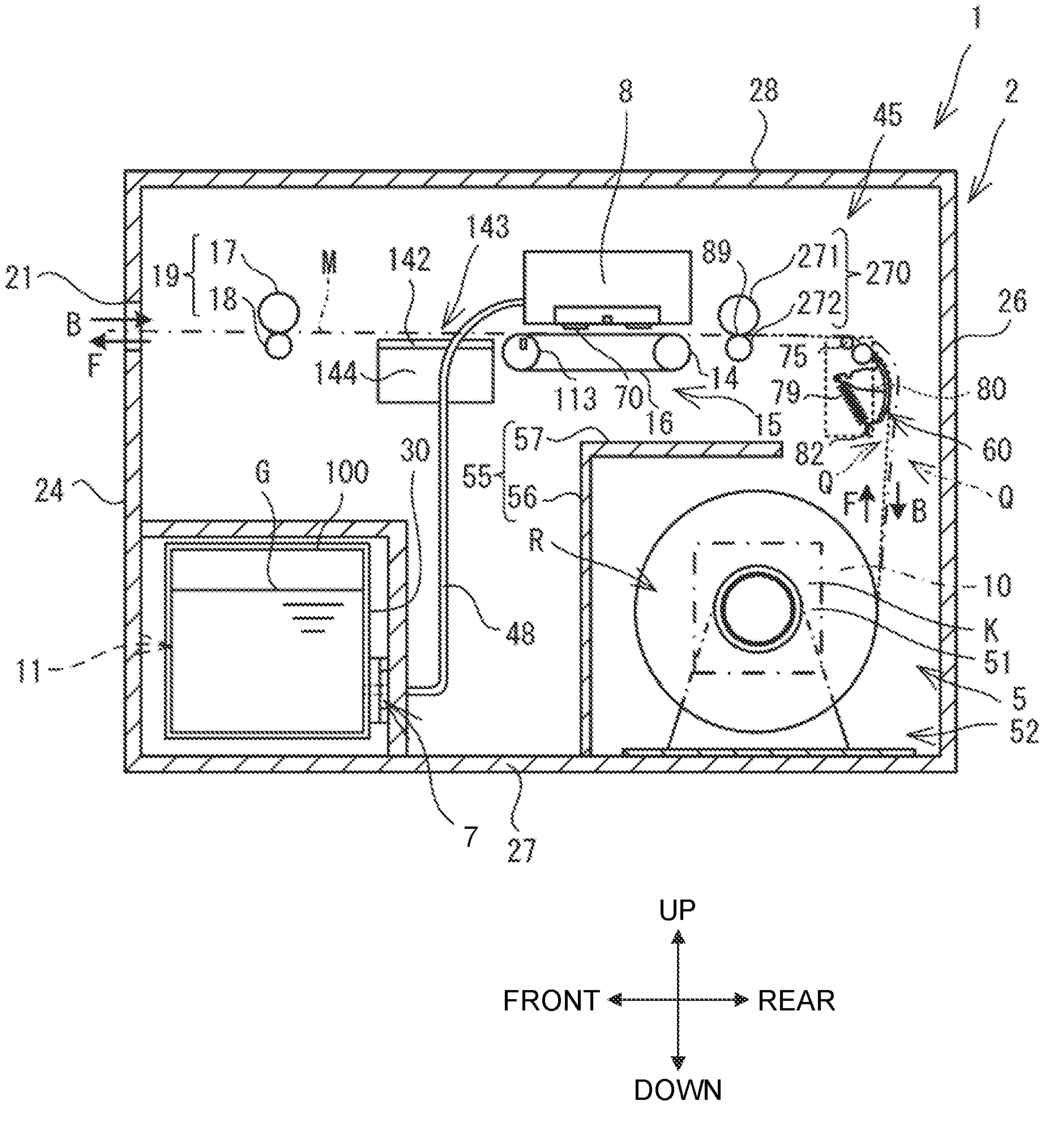
FIG. 2 is a vertical cross-sectional view depicting the internal configuration of the printer 1.

As depicted in FIG. 2, the printer 1 accommodates, in the inside of the casing 2, an ink-jet head 8, a cartridge 30, an ink tube 48, a conveying device 45, a partition wall 55 and a fixing unit 143.

The ink-jet head 8 prints an image on a medium M supplied from a supplying part 5. The ink-jet head 8 is provided with a plurality of nozzles 70 which discharges or ejects an ink G in a discharge direction. The ink-jet head 8 prints the image on the medium M by discharging the ink G from the plurality of nozzles 70. The discharge direction is downward, and the ink-jet head 8 is provided at a location above a conveying route Q of the medium M, while the ink jet head 8 assumes a posture in which the plurality of nozzles 70 is oriented downward. The conveying route Q is a route or path along which the medium M is conveyed since the medium M is fed out from the supplying part 5 and until the medium M is discharged from the discharge port 21 to the outside of the casing 2.

The cartridge 30 is accommodated in the opening part 11. The cartridge 30 accommodates a liquid container 100 which stores the ink in the inside of the cartridge 30, and is installed in an installment part 7 of the opening part 11. The details of this will be described later on. The ink tube 48 is arranged in the inside of the casing 2 and connects the installment part 7 and the ink-jet head 8. The ink Gin the inside of the cartridge 30 is supplied, via the ink tube 48, from the cartridge 30 to the ink-jet head 8.

The conveying device 45 is provided with the supplying part 5, conveying parts 270, 10, 15 and 19, a supporting part 80, a tension applying part 60 and a rotary body 75. The supplying part 5 is provided on a space which is located on the left side of a side cover 251 at the close position and which is located at a rear lower part of the printer 1 and surrounded by the partition wall 55 and the rear wall 26. The supplying part 5 holds a roll R. The supplying part 5 is provided with a shaft part 51 and a magazine 52. The shaft part 51 extends in the left-right direction, and is inserted into a paper tube K of the roll R. The magazine 52 is a supporting stand which has a shape of a letter "U" as seen from the front side. The magazine 52 supports both of left and right end parts of the shaft part 51 so that the shaft part 51 is rotatable about an axis extending in the left-right direction. The shaft part 51 is supported by the magazine 52 in a state that the shaft part 51 is detachable from the magazine 52. The magazine 52 is supported by the printer 1 in a state that the magazine is detachable from the printer 1.

An operator who replaces the roll R arranges the side cover 251 at the open position, takes out the magazine 52 from the inside of the casing 2 and performs a replacing operation of the roll R.

The conveying part 270 conveys the medium M in a conveying direction F in which the medium M is conveyed from the supplying part 5 toward the ink jet head 8 and to a retuning direction B which is opposite or reverse direction to the conveying direction F. The conveying direction F is a direction along the conveying route Q which is from the supplying part 5 toward the ink-jet head 8. A part, of the conveying direction F, from the suppling part 5 up to the tension applying part 60 is a direction which changes depending on a remaining amount of the medium M, and is generally upward. A part, of the conveying direction F, from the tension applying part 60 up to the discharge port 21 is generally frontward.

The conveying part 270 is provided at a location on an upstream side in the conveying direction F with respect to the ink-jet head 8, and on a downstream side in the conveying direction F with respect to the supplying part 5. Namely, the conveying part 270 is provided between the ink-jet head 8 and the supplying part 5 in the conveying route Q of the medium M. The conveying part 270 has a conveying roller 271 which rotates about an axis extending in the left-right direction and a pinch roller 272 which rotates about an axis extending in the left-right direction. The conveying part 270 performs a nip conveyance, by the conveying roller 271 and the pinch roller 272, of conveying the medium M in the conveying direction F which is from the supplying part 5 toward the ink-jet head 8.

The conveying part 10 is provided on the upstream side in the conveying direction F with respect to the conveying part 270, and conveys the medium in the conveying direction F and the retuning direction B. The conveying part 10 rotates the roll R held by the supplying part 5, conveys the medium M in the returning direction B, and takes (winds) the medium M on the roll R. The conveying part 10 detachably engages with the shaft part 51 of the supplying part 5. The conveying part 10 rotates the roll R held by the supplying part 5, conveys the medium M in the conveying direction F, and feeds the medium M from the roll R toward the ink-jet head 8.

The supporting part 80 is provided on the upstream side in the conveying direction F with respect to the conveying part 270 and on the downstream side in the conveying direction F with respect to the conveying part 10, and supports the tension applying part 60 and the rotary body 75. The tension applying part 60 is provided between the conveying part 270 and the conveying part 10 in the conveying route Q. The tension applying part 60 is arranged at a location above the supplying part 5, and is supported in a state that the tension applying part 60 is capable of rocking about an axis extending in the left-right direction, on the upstream side in the conveying direction F with respect to the conveying part 270. The tension applying part 60 makes contact with the medium M and bends the medium M. With this, the tension applying part 60 imparts a tension to the medium M. The tension is a tension acting in a direction opposite to an advancing direction of the medium M.

The rotary body 75 is supported to be rotatable about an axis extending in the left-right direction, on the upstream side in the conveying direction F with respect to the conveying part 270 and on the downstream side in the conveying direction F with respect to at an end part, of the tension applying part 60, on the upstream side in the conveying direction F, namely a lower end part of the tension applying part 60.

The conveying part 15 is provided on a location below the ink-jet head 8 and on the downstream side in the conveying direction F with respect to the conveying part 270, and conveys the medium M in the conveying direction F. The conveying part 15 is provided with a driving roller 113, a driven roller 14 and an endless belt 16. The driving roller 113 and the driven roller 14 are separated from each other in the front-rear direction. The endless belt 16 is stretched over the driving roller 113 and the driven roller 14. Accompanying with the rotation of the endless belt 16, the driven roller 14 is rotated. A position in the up-down direction of an upper end of an outer circumferential surface of the endless belt 16 is substantially same with a position in the up-down direction of a nip point 89 at which the medium M is nipped by the conveying part 270. The upper end of the outer circumferential surface of the endless belt 16 faces or is opposed to the plurality of nozzles 70 of the ink-jet head 8. The upper end of the outer circumferential surface of the endless belt 16 conveys the medium M in a state that the medium M which is (being) conveyed between the conveying part 270 and the conveying part 19 is attracted, by suction from a position below the medium M by a static electricity or a negative pressure, to the endless belt 16.

The fixing unit 143 is arranged on the downstream side in the conveying direction F with respect to the ink-jet head 8 and on the upstream side in the conveying direction F with respect to the conveying part 19. Further, the fixing unit 143 is provided on a location below the conveying route Q. The fixing unit 143 is provided with a heat source 144 which is capable of performing conduction heating and a heating plate (hot plate) 142 which is heated by the heat source 144. The heating plate 142 supports the medium M which passes the conveying route Q from the position below the medium M. The medium M is heated by the heating plate 142, thereby causing the ink G discharged onto the medium M by the ink-jet head 8 to be fixed on the medium M.

The conveying part 19 is provided on the downstream side in the conveying direction F with respect to the ink-jet head 8 and the fixing unit 143 and on the upstream side in the conveying direction F with respect to the discharge port 21, and conveys the medium M in the conveying direction F and in the returning direction B. The conveying part 19 has a conveying roller 17 and a pinch roller 18 each of which rotates about an axis extending in the left-right direction, and performs a nip conveyance, by the conveying roller 17 and the pinch roller 18, of conveying the medium M while nipping the medium M between the conveying roller 17 and the pinch roller 18 in the up-down direction.

In a case that a printing processing is executed, a controller of the printer 1 drives the conveying parts 270, 10, 15 and 19 so as to convey the medium M. The printer 1 adjusts a driving amount of each of the conveying parts 270 and 10 so that the tension is applied to the medium M by the tension applying part 60. The controller of the printer 1 drives the ink-jet head 8 synchronizing with the conveyance of the medium M, thereby discharging, onto the medium M, the ink G supplied from the cartridge 30 via the ink tube 48. The controller of the printer 1 drives the heat source 144 so as to fix, to the medium M, the ink G on the medium M. The medium M is discharged from the discharge port 21 to the outside of the casing 2.

<Configuration of Accommodating Part 6>

Figure 3:
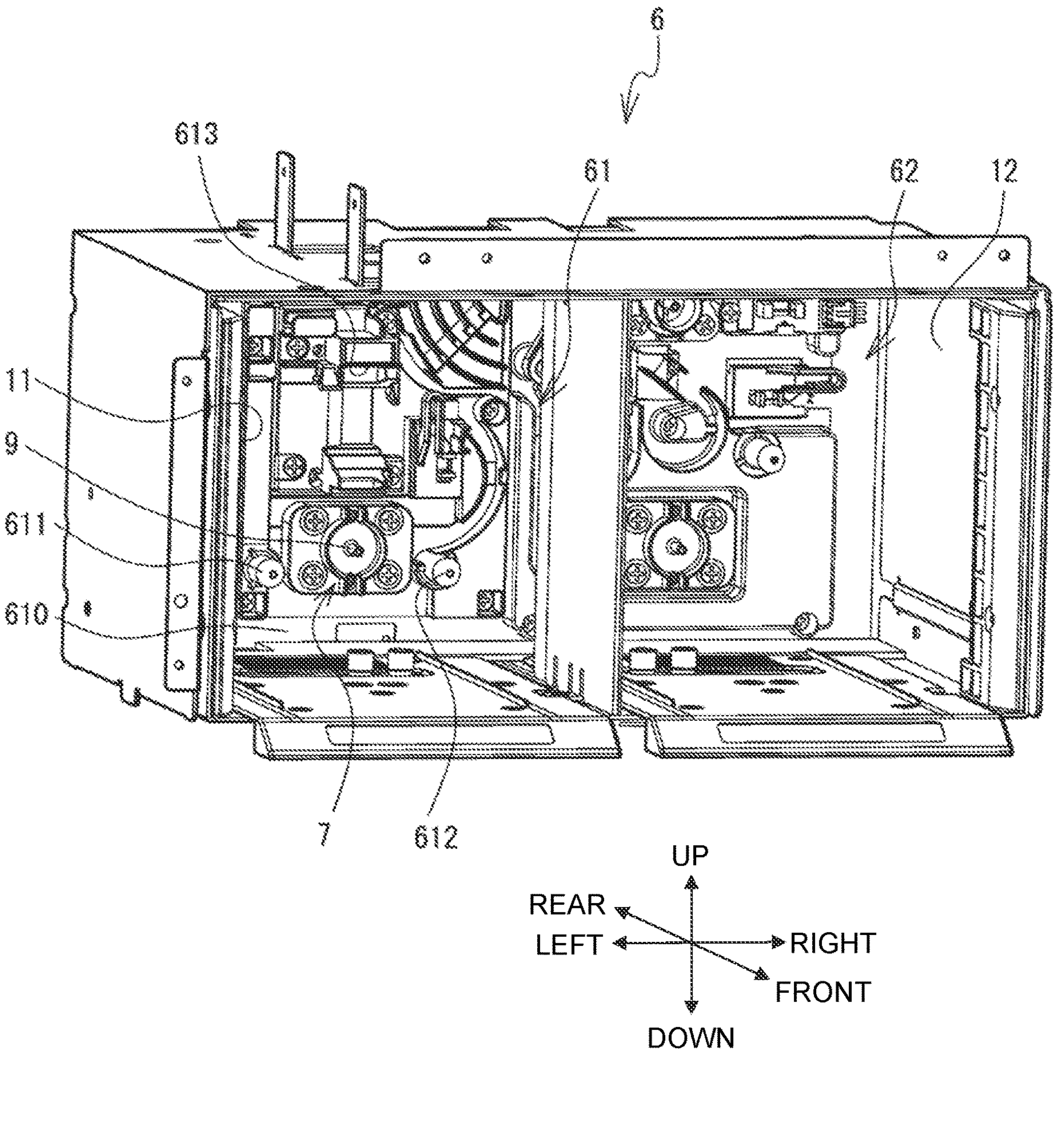
FIG. 3 is a perspective view of an accommodating part 6.
Figure 4:
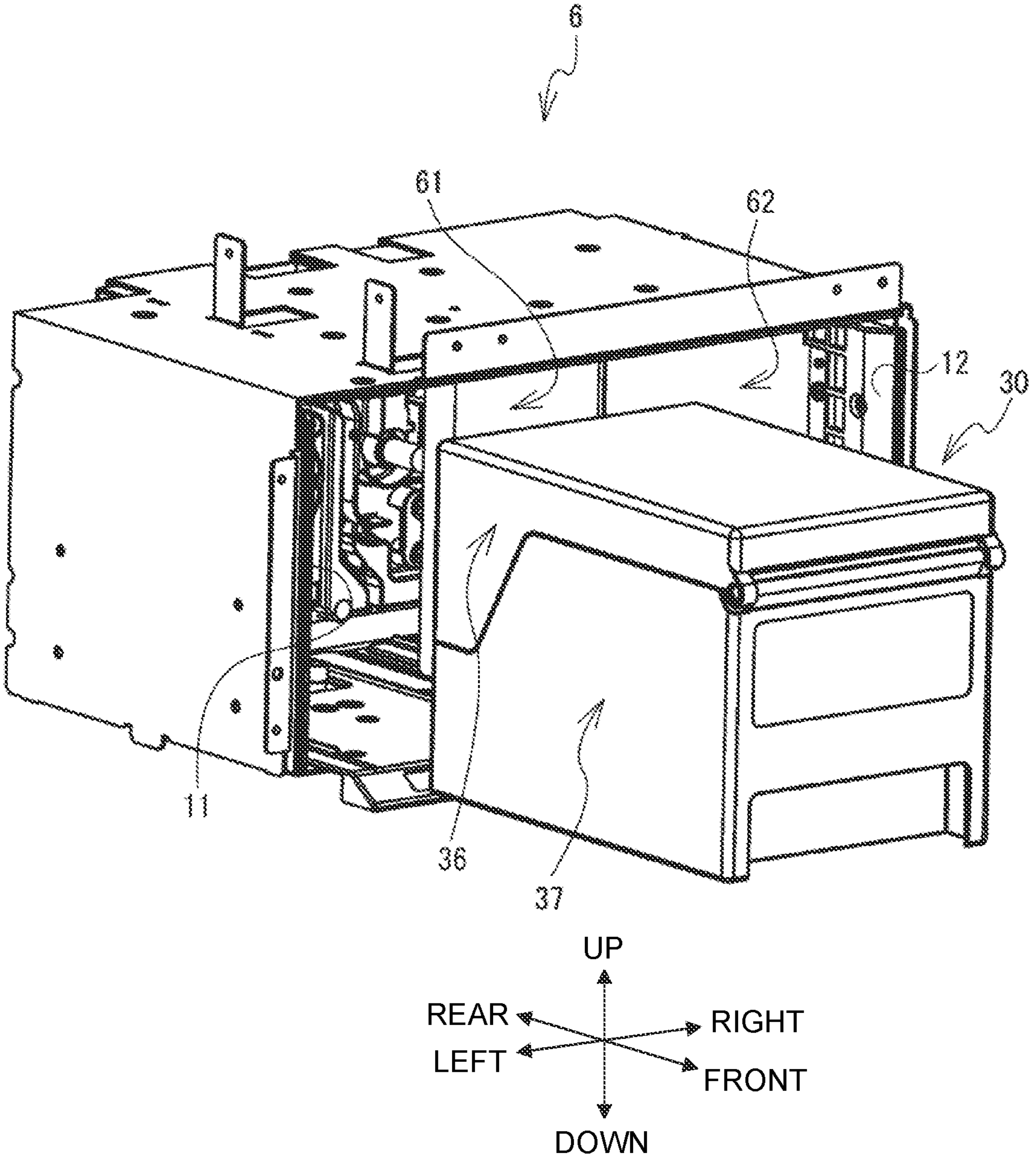
FIG. 4 is a perspective view depicting a state that a cartridge 30 is being inserted into the accommodating part 6.
Figure 5:
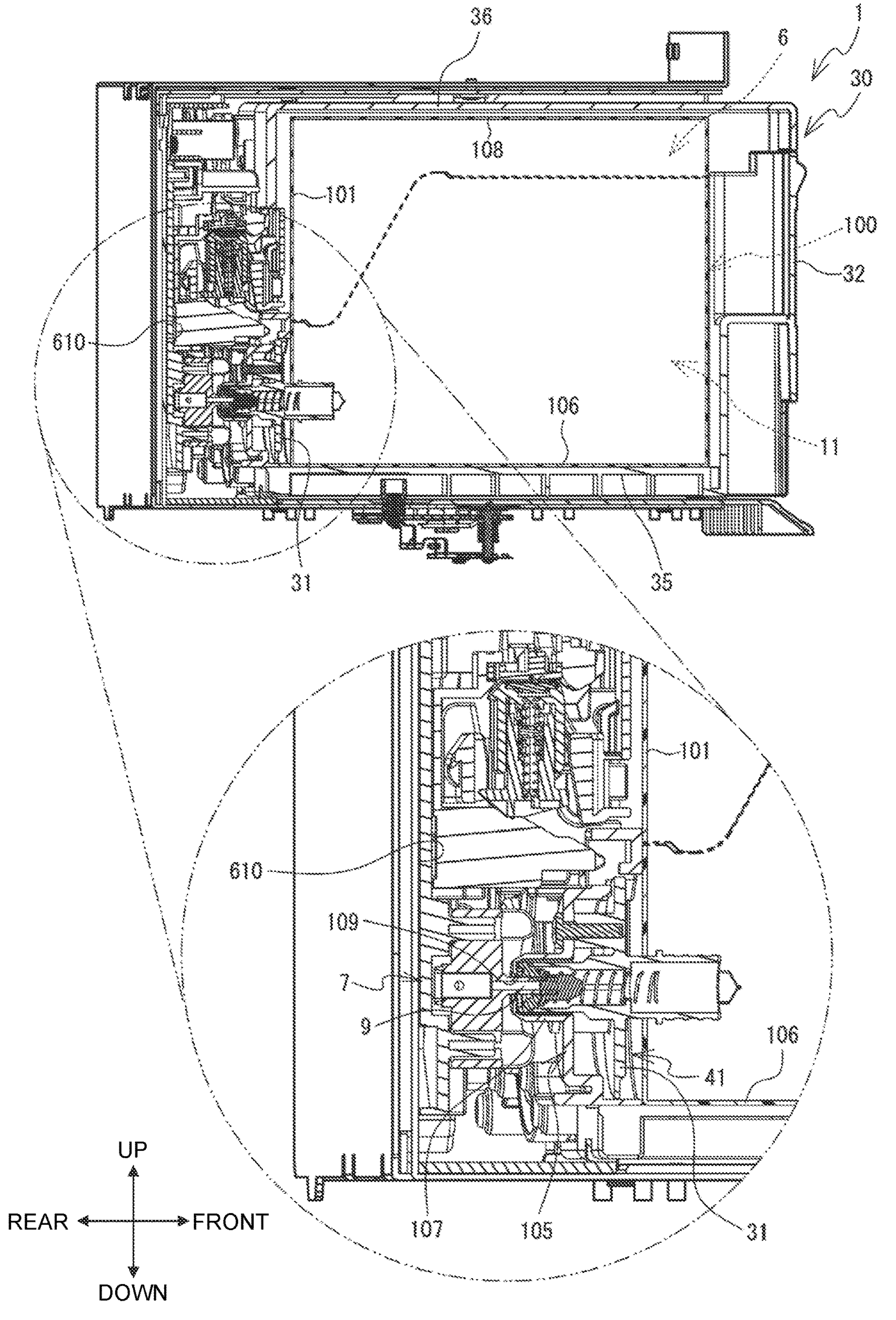
FIG. 5 is a vertical cross-sectional view depicting a state that the cartridge 30 is inserted into the accommodating part 6.
Figure 6:
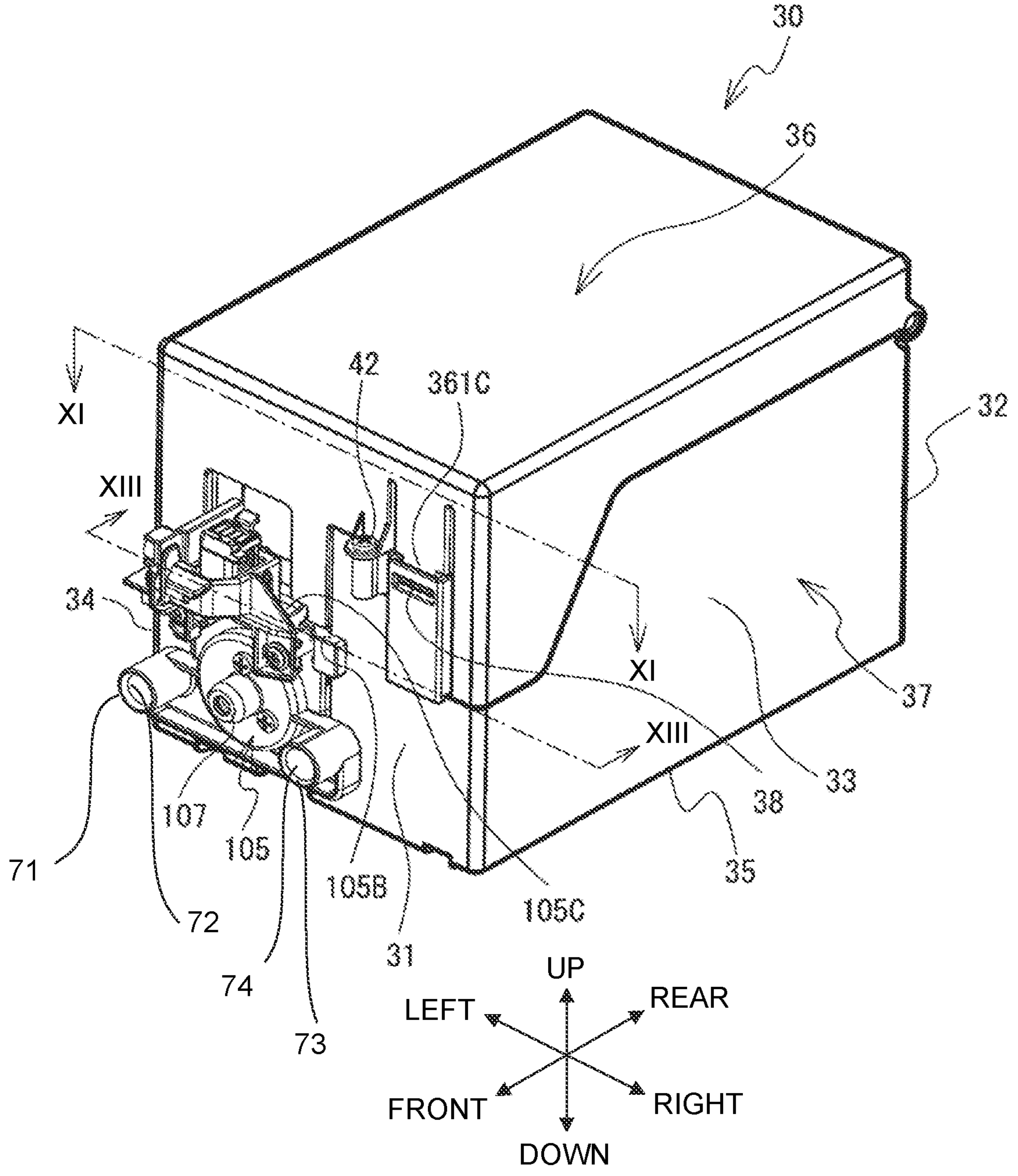
FIG. 6 is a perspective view of the cartridge 30.

With reference to FIGS. 3 to 5, an explanation will be given about the configuration of the accommodating part 6 provided on the inside of the printer 1. FIGS. 3 and 4 depict only the accommodating part 6, and omits other configurations of the printer 1. The accommodating part 6 is provided on the inside of the front cover 23 of the printer 1. The accommodating part 6 has a shape of a rectangular parallelepiped which extends in the left-right direction, and is provided with, from the left side toward the right side, a first accommodating part 61 and a second accommodating part 62. The first accommodating part 61 and the second accommodating part 62 are each a space having a shape of a rectangular parallelepiped, and provided, respectively, with an opening part 11 and an opening part 12 which are opened frontward. In a case that the front cover 23 is turned from the close state to the open state, the opening parts 11 and 12 of the accommodating part 6 are exposed. Each of the opening parts 11 and 12 is a rectangular opening. As depicted in FIGS. 4 and 5, the first accommodating part 61 accommodates a cartridge 30 (to be described later on).

Figure 7:
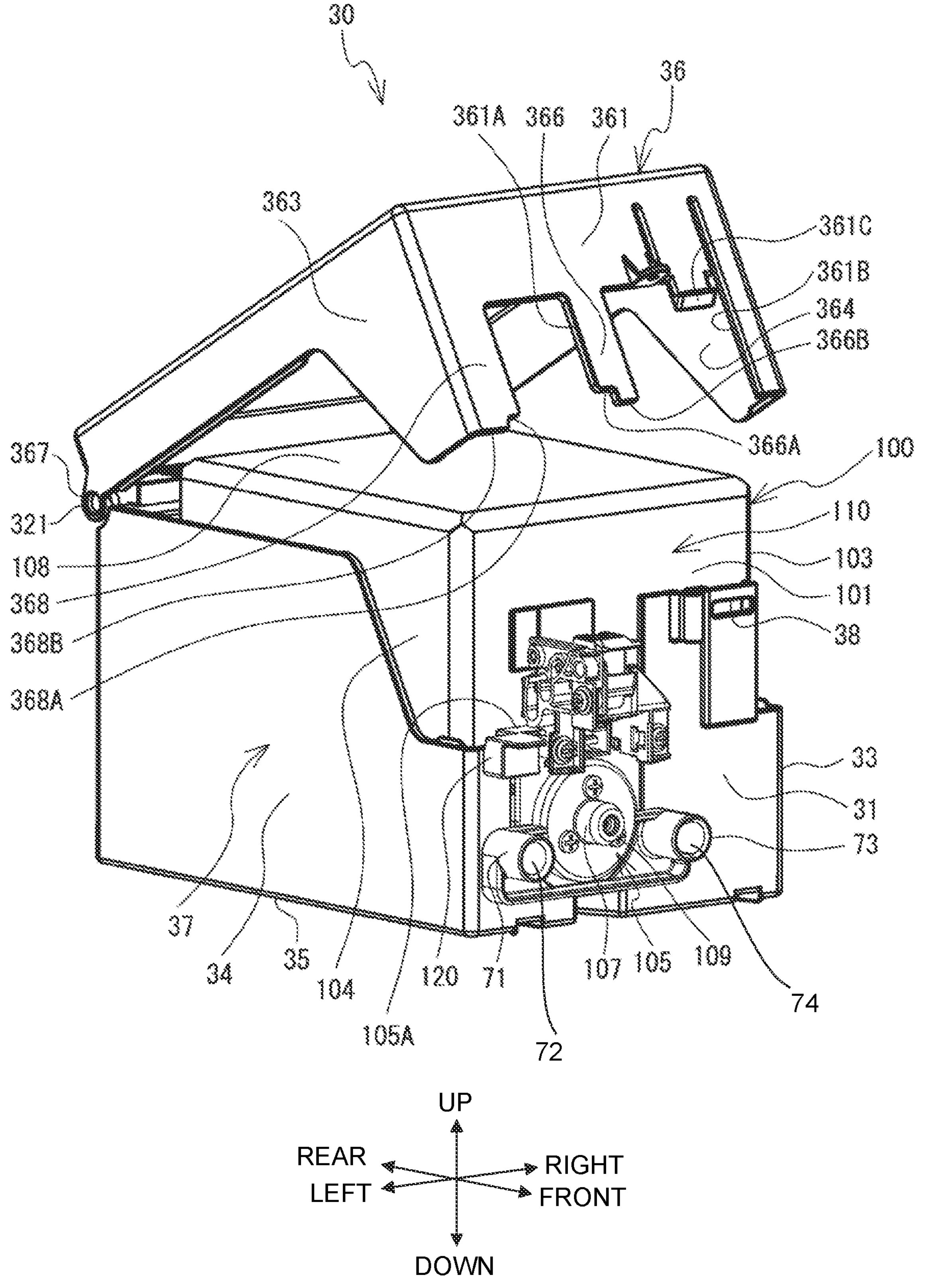
FIG. 7 is a perspective view depicting a state that a liquid container 100 is installed in the cartridge 30.

As depicted in FIG. 6, the cartridge 30 has a shape of a rectangular parallelepiped. As depicted in FIG. 7, the cartridge 30 accommodates or stores the liquid container 100 which stores a liquid. The liquid container 100 is a container which accommodates or stores a liquid. The liquid container 100 is a pouch made of a synthetic resin. In the following, an example that the ink is stored in the liquid container 100 will be explained. The details of the configuration of the cartridge 30 will be described later on. The second accommodating part 62 accommodates a non-illustrated maintenance box.

As depicted in FIGS. 3 and 5, the first accommodating part 61 is provided with a rear wall 610. The rear wall 610 is a rectangular wall which is provided on the rearmost side in the first accommodating part 61, and extends in the up-down direction and the left-right direction. The rear wall 610 is provided with the installment part 7. The installment part 7 is provided on a location below a center in the up-down direction of the rear wall 610. In a case that the cartridge 30 is accommodated in the first accommodating part 61, a tap (tap unit, mouth stopper, mouth plug) 105 of the liquid container 100 accommodated in the cartridge 30 is installed in the installment part 7. The installment part 7 is provided with a supply needle 9 which projects frontward. The supply needle 9 is hollow inside. In a case that the cartridge 30 is accommodated in the first accommodating part 61 and that the tap 105 is installed in the installment part 7, the supply needle 9 enters into the inside of a connecting part 107 of the liquid container 100. Accordingly, the ink inside the liquid container 100 is supplied to an ink-jet head 8 of the printer 1.

Further, a pair of positioning (alignment) projections 611 and 612 is provided on the rear wall 610 of the first accommodating part 61. The positioning projection 611 and the positioning projection 612 are provided, respectively, on positions which are symmetrical in the left-right direction with respect to the supply needle 9. The positioning projection 611 and the positioning projection 612 project frontward. A front end of each of the positioning projection 611 and the positioning projection 612 protrudes frontward farther than a front end of the supply needle 9. In a case that the cartridge 30 is inserted into the first accommodating part 61, the positioning projection 612 fits into a circular hole 72 of a first positioning part 71 (to be described later on) and the positioning projection 611 fits into an elongated hole (slit) 74 of a second positioning part 73 (to be described later on). Note that in FIGS. 6 and 7, the elongated hole 74 is depicted as a circular hole like the circular hole 72.

The maintenance box (omitted in the drawings) is accommodated in the second accommodating part 62. The maintenance box has a shape of a rectangular parallelepiped, similarly to the cartridge 30. The maintenance box is fixed in a state that the maintenance box is accommodated in the second accommodating part 62. An accommodating body accommodating a nozzle cleaning liquid for maintenance is accommodated in the maintenance box. At a time of performing maintenance, the nozzle cleaning liquid is supplied to the ink-jet head from the maintenance box.

<Configuration of Cartridge 30>

With reference to FIGS. 6 to 9, the configuration of the cartridge 30 will be explained. As depicted in FIG. 6, the cartridge 30 has a shape of a rectangular parallelepiped, and is provided with a lower case 37 and a cover 36. As depicted in FIG. 7, the cartridge 30 accommodates or stores the liquid container 100 in the inside of the lower case 37, and the cover 36 will be closed as depicted in FIG. 6.

Figure 8:
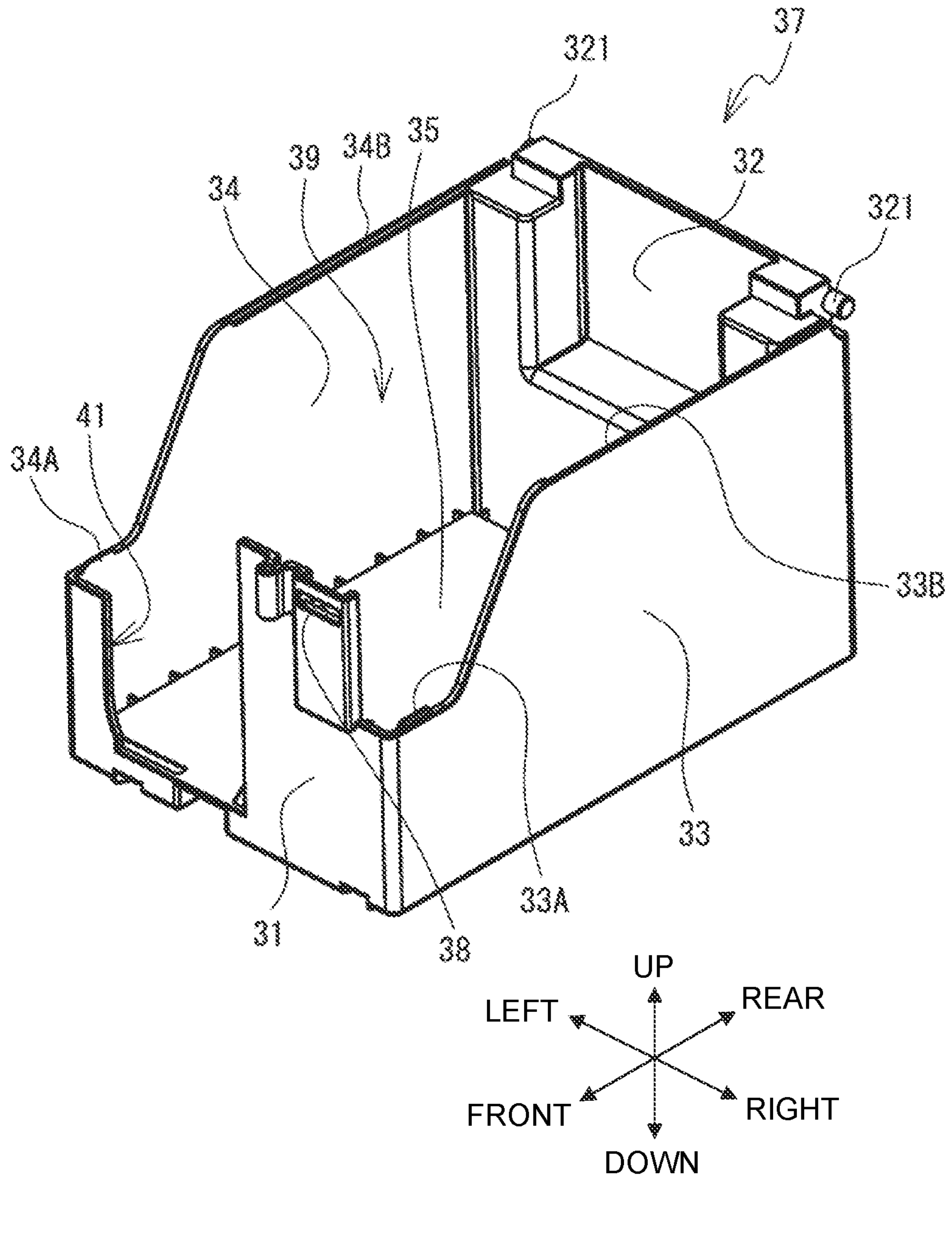
FIG. 8 is a perspective view of a lower case 37.

As depicted in FIG. 8, the lower case 37 is provided with a front wall 31, a rear wall 32, a right wall 33, a left wall 34 and a bottom wall 35. The bottom wall 35 is a rectangular plate which is long in the front-rear direction. The front wall 31 extends upward from a front end of the bottom wall 35. A tap engaging part 41 is provided on a left lower part of the front wall 31. The tap engaging part 41 is an opening part which penetrates the front wall 31 in the front-rear direction and which is opened upwardly. As depicted in FIG. 7, the tap 105 of the liquid container 100 engages with the tap engaging part 41 from a position above the tap engaging part 41. The front wall 31 supports the tap 105 of the liquid container 100. A locking part 38 is provided on a right upper part of the front wall 31. The locking part 38 locks a locking claw 361C of the cover 36 which will be described later on.

As depicted in FIG. 8, the right wall 33 of the lower case 37 extends upward from a right end of the bottom wall 35. An upper part on the front side of the right wall 33 is inclined upward further toward the rear side. A length in the up-down direction of a front end part of the right wall 33 is substantially same as a length in the up-down direction of a right end part of the front wall 31. The left wall 34 extends upward from a left end of the bottom wall 35. A length in the up-down direction of a front end part of the left wall 34 is substantially same as a length in the up-down direction of a left end part of the front wall 31. An upper part on the front side of the left wall 34 is inclined upward further toward the rear side. A length in the up-down direction of a part on the rear side of the right wall 33 is approximately two times the length in the up-down direction of the front end part of the right wall 33, and a length in the up-down direction of a part on the rear side of the left wall 34 is approximately two times the length in the up-down direction of the front end part of the left wall 34.

The rear wall 32 extends upward from a rear end of the bottom wall 35. A length in the up-down direction of the rear wall 32 is approximately same as the length in the up-down direction of the part on the rear side of each of the right wall 33 and the left wall 34. A pair of shafts 321 protrudes, in the left-right direction, respectively, on a left part and a right part of an upper end of the rear wall 32. An opening 39 which is opened upward is defined by the front wall 31, the right wall 33, the left wall 34 and the rear wall 32. The liquid container 100 is accommodated in the inside of the opening 39.

Figure 9:
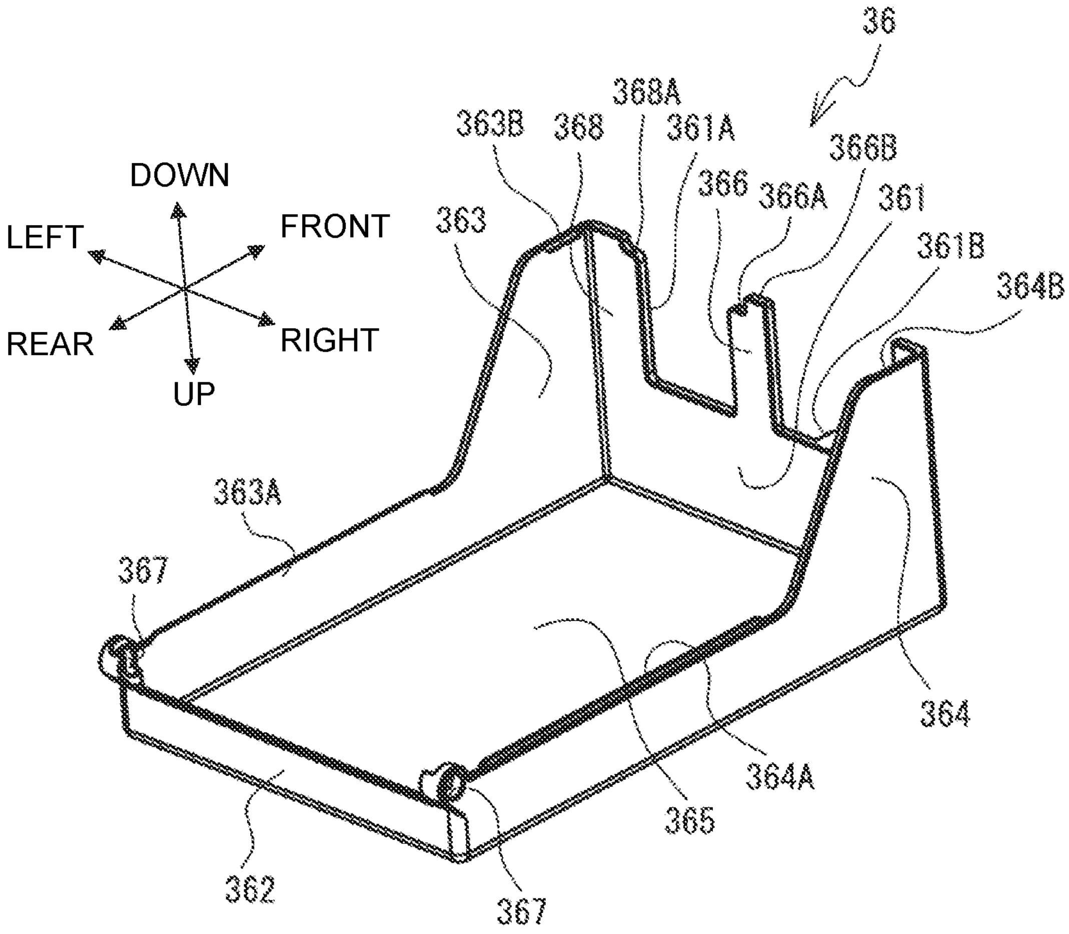
FIG. 9 is a perspective view of a cover 36 depicting a state that the lower side of the cover 36 is oriented upward.

As depicted in FIGS. 7 and 9, the cover 36 is provided with an upper wall 365, a front wall 361, a rear wall 362, a left wall 363 and a right wall 364. The upper wall 365 is a rectangular plate which is long in the front-rear direction. The front wall 361 extends downwards from a front end part of the upper wall 365. A cutout part 361A and a cutout part 361B are provided on the front wall 361, and a sidewall 366 extends downward between the cutout part 361A and the cutout part 361B. A lower end of the sidewall 366 is provided with a first contact part 366A and a second contact part 366B. The first contact part 366A and the second contact part 366B make contact, respectively, with a contact surface 105C and a contact surface 105B (which will be described later on) of the tap 105. The first contact part 366A is constructed of a cutout part which is formed by cutting out a part of a lower end, of the sidewall 366, in each of the up-down direction and the left-right direction crossing the up-down direction. Further, the second contact part 366B is constructed of an end part which is a part, of the lower end of the sidewall 366, extending in a horizontal direction.

Furthermore, a sidewall 368 extends downward at a left end of the front wall 361. A lower end of the sidewall 368 is provided with a third contact part 368A. The third contact part 368A makes contact with a contact surface 105A, of the tap 105, which will be described later on. The third contact part 368A is constructed of a cutout part which is formed by cutting out a part of a lower end, of the sidewall 368, in each of the up-down direction and the left-right direction crossing the up-down direction.

The rear wall 362 is a rectangular plate which extends downward from a rear end of the upper wall 365, and a pair of bearing parts 367 is provided, respectively, on both of left and right end parts of a lower end of the rear wall 362. The left wall 363 is a plate extending downward from a left end of the upper wall 365; a length in the up-down direction of a front side of the left wall 363 is longer than a length in the up-down direction of a rear side of the left wall 363; and the left wall 363 is provided with an inclined part which is inclined toward the front side from the rear side. The right wall 364 is a plate extending downward from a right end of the upper wall 365; a length in the up-down direction of a front side of the right wall 364 is longer than a length in the up-down direction of a rear side of the right wall 364; and the right wall 364 is provided with an inclined part which is inclined toward the front side from the rear side.

The pair of bearing parts 367 of the cover 36 are rotatably supported, respectively, by the pair of shafts 321 of the lower case 37, thereby causing the cover 36 to rotate to a close state in which the cover 36 covers the opening 39 and to an open state in which the cover 36 does not cover the opening 39. In the open state depicted in FIG. 7, the operator is capable of attaching and detaching the liquid container 100 with respect to the cartridge 30. In a case that the cover 36 is in the closed state, the cartridge 30 is accommodatable in the accommodating part 6 of the printer 1.

<Structure for Preventing Sidewall from Toppling Inward>

With reference to FIGS. 8, 9 and 14, a structure for preventing a sidewall of the cartridge 30 from toppling inward will be explained. As depicted in FIG. 8, a rib 33A which extends in the front-rear direction and upward is provided on an upper part of the front end-side of the right wall 33 of the lower case 37. The rib 33A is provided on the inside of the right wall 33. Specifically, the rib 33A is provided on the upper edge of the right wall 33 at a position closer to the inner surface of the right wall 33 than to the outer surface of the right wall 33. A cutout part 33B which extends in the front-rear direction is provided in an upper part of the rear end-side of the right wall 33. Further, a rib 34A which extends in the front-rear direction and upward is provided on an upper part of the front end-side of the left wall 34 of the lower case 37. The rib 34A is provided on the inside of the left wall 34. Specifically, the rib 34A is provided on the upper edge of the left wall 34 at a position closer to the inner surface of the left wall 34 than to the outer surface of the left wall 34. A cutout part 34B which extends in the front-rear direction is provided in an upper part on the rear end-side of the left wall 34.

FIG. 9 is a perspective view depicting the cover 36 in a state that a lower side of the cover 36 is oriented upward. As depicted in FIG. 9, a cutout part 363B which extends in the front-rear direction is provided in a lower end part on the front end-side of the left wall 363 of the cover 36. A rib 363A which extends in the front-rear direction and downward is provided on a part, of the left wall 363, of which height is lower than that of a part on the front end-side of the left wall 363. The rib 363A is provided on the inside of the left wall 363. Specifically, the rib 363A is provided on the lower edge of the left wall 363 at a position closer to the inner surface of the left wall 363 than to the outer surface of the left wall 363. Further, a cutout part 364B which extends in the front-rear direction is provided in a lower end part on the front end-side of the right wall 364 of the cover 36. A rib 364A which extends in the front-rear direction and downward is provided on a part, of the right wall 364, of which height is lower than that of a part on the front end-side of the right wall 364. The rib 364A is provided on the inside of the right wall 364. Specifically, the rib 364A is provided on the lower edge of the right wall 364 at a position closer to the inner surface of the right wall 364 than to the outer surface of the right wall 364.

As depicted in FIG. 14, in a state that the cover 36 covers the opening 39 of the lower case 37, the rib 363A of the left wall 363 of the cover 36 makes contact with the cutout part 34B of the left wall 34 of the lower case 37, and supports the left wall 34 from the inner side toward the outer side (in a direction of an arrow A). Further, the rib 364A of the right wall 364 of the cover 36 makes contact with the cutout part 33B of the right wall 33 of the lower case 37, and supports the right wall 33 from the inner side toward the outer side (in a direction of an arrow A). That is, the rib is provided on the inside of one of the sidewall of the lower case 37 and the sidewall of the cover 36, which is shorter than the other of the sidewalls in a contact direction (the up-down direction) in which the sidewalls make contact with each other. The rib is configured to support the inside of the other of the sidewall of the lower case 37 and the sidewall of the cover 36, which is longer in the contact direction than the one of the sidewalls.

<Configuration of Liquid Container 100>

With reference to FIG. 7, the configuration of the liquid container 100 will be explained. The liquid container 100 stores, as an example, an ink. An example of the ink is a black ink. As depicted in FIG. 7, the liquid container 100 is provided with a case 110. The case 110 is formed of a pouch made of a synthetic resin. The case 110 has a shape of a rectangular parallelepiped which is long in the front-rear direction. The case 110 is provided with a front surface 101, a rear surface (omitted in the drawings), a right side surface 103, a left side surface 104, a bottom surface (omitted in the drawings) and an upper surface 108. The bottom surface and the upper surface 108 are each a rectangle which is long in the front-rear direction. The front surface 101 is a rectangle which extends upward from a front end of the bottom surface. The right side surface 103 is a rectangle which extends upward from a right end of the bottom surface and which is long in the front-rear direction. The left side surface 104 is a rectangle which extends upward from a left end of the bottom surface and which is long in the front-rear direction. The rear surface is a rectangle which extends upward from a rear end of the bottom surface.

<Configuration of Tap>

As depicted in FIG. 7, the tap 105 is provided on a left lower part of the front surface 101. The tap 105 is provided with a connecting part 107, the first positioning (alignment) part 71 and the second positioning (alignment) part 73. The connecting part 107 is a cylinder which extends, with respect to the front surface 101, in a front direction which is orthogonal to the front surface 101. The connecting part 107 has the supply port 109 opened in the front direction at a center of the connecting part 107. The supply port 109 of the connecting part 107 is a supply port via which the ink is supplied from the liquid container 100 to the outside of the liquid container 100. The connecting part 107 extends from the front surface 101 in an opening direction of the supply port 109. Further, a sealing member (omitted in the drawings) is provided on a part which is located on the back side (on the rear side) of the supply port 109. In a case, for example, that the cartridge 30 is detached from the installment part 7 and connection between the supply port 109 of the connecting part 107 and the supply needle 9 is released, any leaking of the ink from the supply port 109 is suppressed by the sealing member.

Further, the first positioning part 71 extends from the front surface 101 in the opening direction of the supply port 109. Furthermore, the second positioning part 73 extends from the front surface 101 in the opening direction of the supply port 109.

Figure 10:
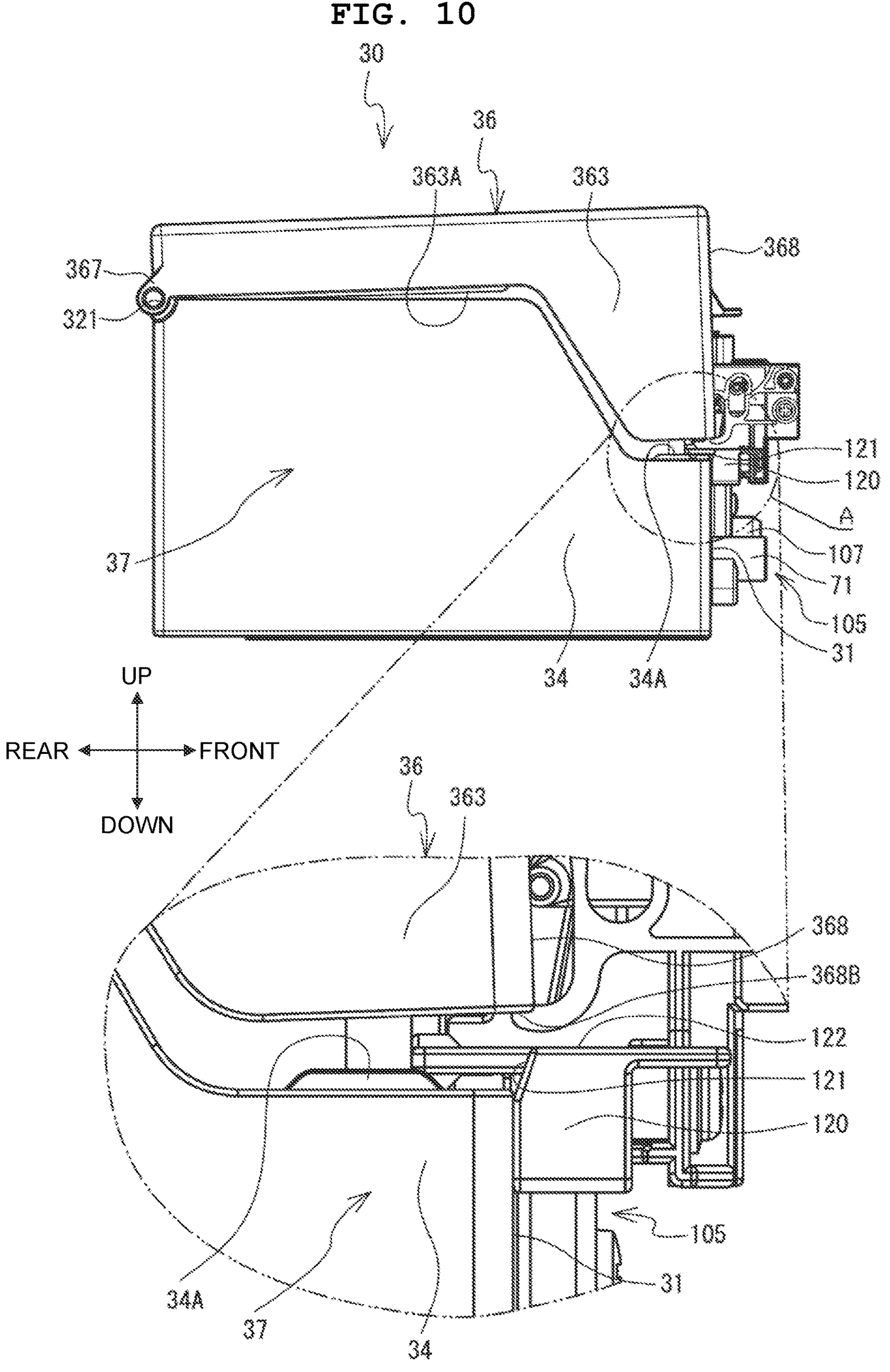
FIG. 10 is a side view depicting a state that the cover 36 is being closed with respect to the lower case 37.

As depicted in FIGS. 7 and 10, the tap 105 is provided with a guiding member 120 at a location above the first positioning part 71. As depicted in FIG. 10, the guiding member 120 is a member having a shape of a rectangular parallelepiped which projects frontward from the front surface 101. An inclined surface 121 is provided on a rear end of an upper part of the guiding member 120. The inclined surface 121 is a surface inclined obliquely downward from the front side toward the rear side. In a case that the cover 36 of the cartridge 30 is closed, the inclined surface 121 guides a lower end part 368B, of the sidewall 368 of the cover 36 of the cartridge 30, rearward. Namely, the inclined surface 121 guides the sidewall 368 of the cover 36 to the front wall 31 of the lower case 37.

Figure 11:
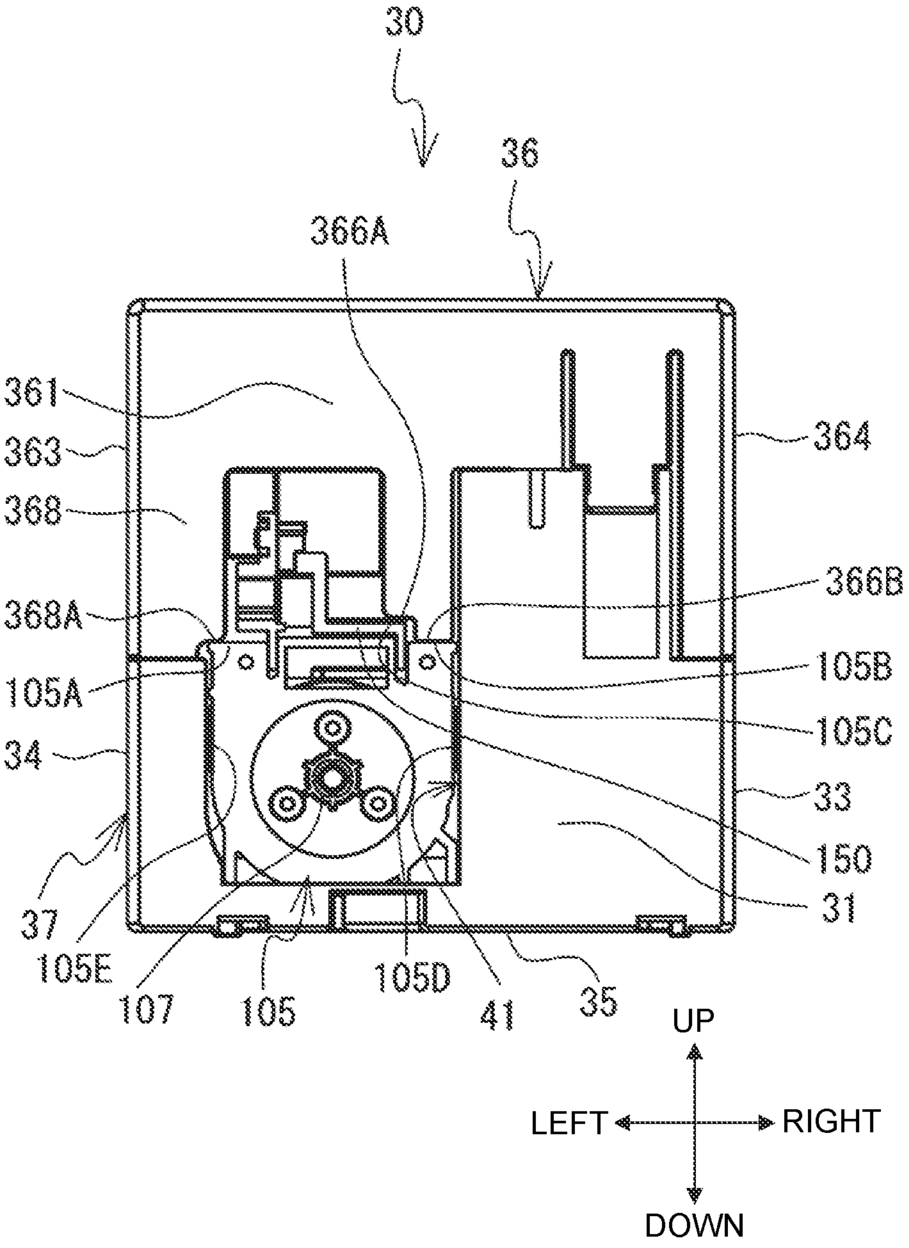
FIG. 11 is a cross-sectional view in an XI-XI line in FIG. 6.
Figure 12:
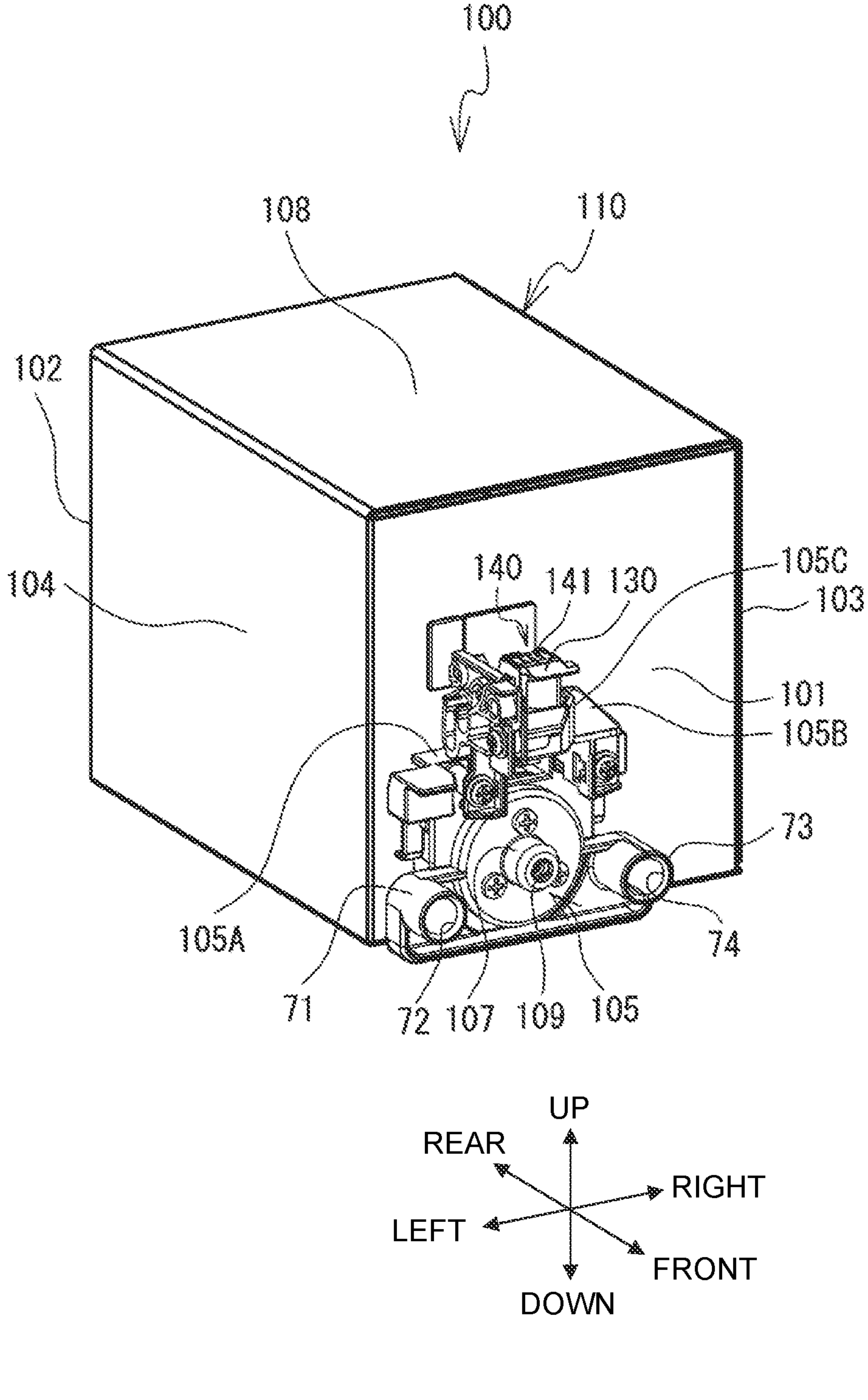
FIG. 12 is a perspective view depicting mainly a front surface of a liquid container 100.
Figure 13:
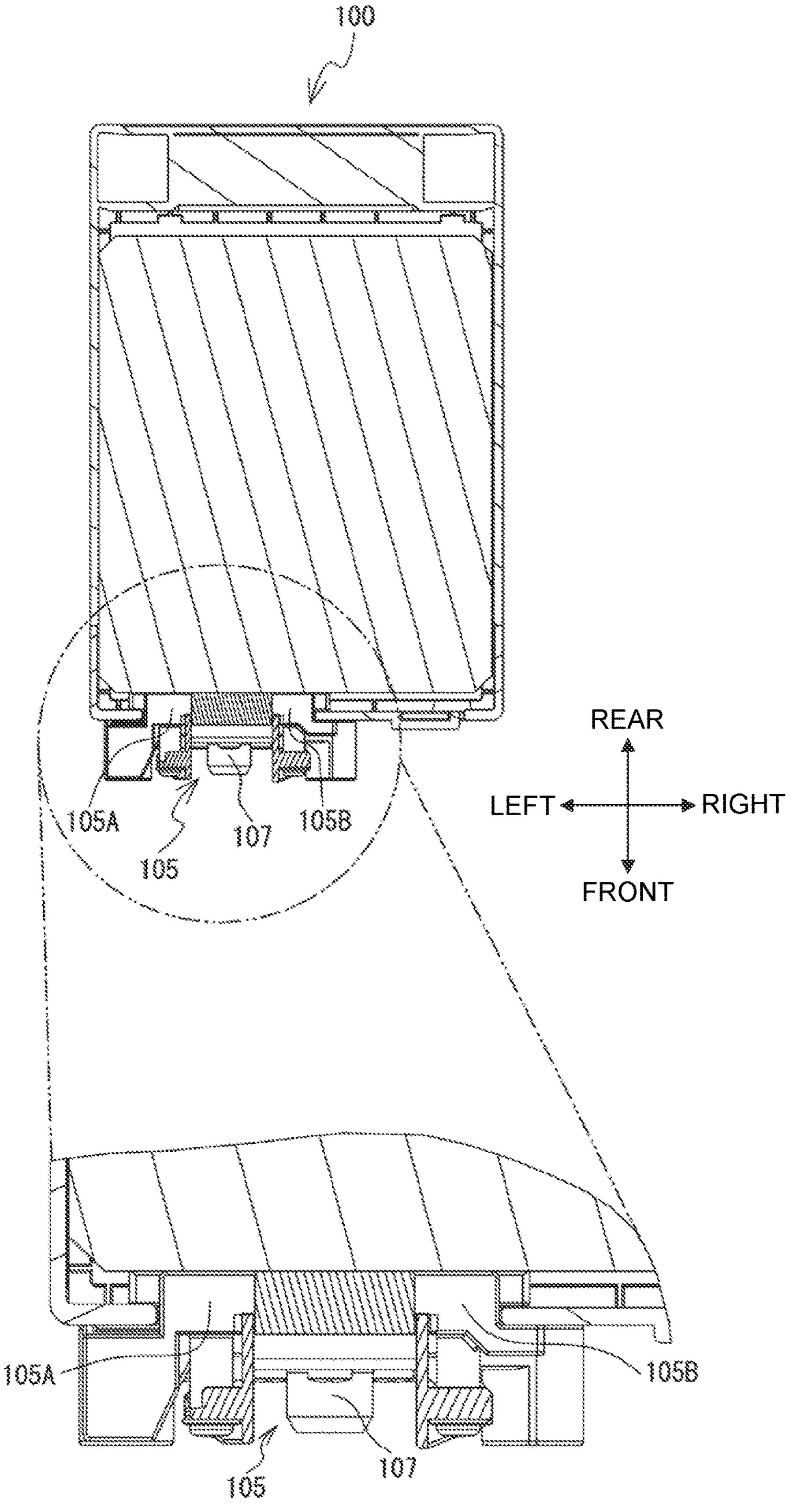
FIG. 13 is a cross-sectional view in a XIII-XIII line in FIG. 6.

Next, with reference to FIGS. 11 to 13, the contact surfaces 105A, 105B and 105C of the tap 105 will be explained. FIG. 11 is a cross-sectional view in an XI-XI line in FIG. 6, and FIG. 13 is a cross-sectional view in a XIII-XIII line in FIG. 6. As depicted in FIGS. 11 to 13, the tap 105 is provided with the contact surfaces 105A, 105B and 105C at a boundary between the tap 105 and the cover 36. The contact surface 105A is provided on an upper left location with respect to the connecting part 107 of the tap; the contact surface 105B is provided on an upper right location with respect to the connecting part 107 of the tap; and the contact surface 105C is provided on an upper right location with respect to the connecting part 107 of the tap shifted leftward from the contact surface 105B. In a case that the cover 36 is in a closed state (see FIG. 6), the third contact part 368A, the second contact part 366B and the first contact part 366A of the cover 36 make contact, respectively, with the contact surface 105A, the contact surface 105B and the contact surface 105C.

<Accommodation of Liquid Container 100 into Cartridge 30 and Effect of Embodiment>

In a case that the liquid container 100 is to be installed in the cartridge 30, the cover 36 of the cartridge 30 is opened and the liquid container 100 is accommodated in the inside of the lower case 37, as depicted in FIG. 7. Next, as depicted in FIG. 10, the cover 36 is closed to thereby cover the opening 39 (see FIG. 8) of the lower case 37. In this situation, the inclined surface 121 of the guiding member 120 guides the side surface 368 of the cover 36 to the front wall 31 of the lower case 37. Accordingly, it is possible to lower a possibility that the lower end part 368B of the sidewall 368 of the cover 36 might ride on an upper surface of the guiding member 120 of the tap 105. In this situation, the locking part 38 of the lower case 37 locks the locking clow 361C of the cover 36. Afterwards, the cover 36 is fixed to the lower case 37 with a screw 42.

In this state, as depicted in FIG. 11, the first contact part 366A and the second contact part 366B make contact, respectively, with the contact surface 105C and the contact surface 105B of the tap 105. Further, the third contact part 368A makes contact with the contact part 105A of the tap 105. Accordingly, since the possibility that the tap 105 of the liquid container 100 might float upward is lowered, the position of the tap 105 with respect to the lower case 37 becomes stable. Accordingly, it is possible to install the tap 105 with respect to the supply needle 109, without any deviation in the position of the tap 105. Further, in the above-described embodiment, each of a plurality of contact parts (which are the first contact part 366A, the second contact part 366B and the third contact part 368A) makes contact with (abut) the tap 105 from the position above the tap 105, the possibility that the tap 105 of the liquid container 100 might float or rise upward is further lowered. The contact (abutting) between the plurality of contact parts (that is, the first contact part 366A, the second contact part 366B and the third contact part 368A) and the tap 105 (specifically, the contact surfaces 105A, 105B, 105C) may be maintained as long as the cover 36 in in the closed state.

In a case that the cover 36 covers the opening 39 of the lower case 37, since the sidewall of the cover 36 is guided to the front wall 31 of the lower case 37 by the inclined surface of the tap (tap unit), it is possible to lower a possibility that the sidewall of the cover 36 might ride on the tap (tap unit).

As depicted in FIG. 11, since each of the cutout part of the first contact part 366A and the cutout part of the third contact part 368B, which are included in the plurality of contact parts, makes contact with the tap 105 in the up-down direction and the direction crossing the up-down direction, it is possible to lower such a possibility that the tap 105 of the liquid container 100 is moved. Further, since an end part, of the second contact part 366B, which extends in a horizontal direction makes contact with the tap 105 in the up-down direction, the possibility that the tap 105 of the liquid container 100 might float or rise upward is lowered. Furthermore, since contact surfaces 105D and 105E of the tap 105 make contact with the front wall 31 of the lower case 37, the position of the tap 105 with respect to the lower case 37 becomes stable.

Further, as depicted in FIG. 14, each of the ribs 363A, 364A is provided on the inside of the one of the sidewall of the lower case 37 and the sidewall of the cover 36, which is shorter than the other of the sidewalls in the contact direction (the up-down direction), that is on the inside of the left wall 363 and the right wall 364. The rib is configured to support the inside of the other of the sidewall of the lower case 37 and the sidewall of the cover 36, which is longer in the contact direction than the one of the sidewalls. The rigidity of the sidewall of which length in the contacting direction is short is higher than the rigidity of the sidewall of which length in the contacting direction is long. Accordingly, the sidewall of which length in the contacting direction is short supports, from the inner side toward the outer side (in a direction of the arrow A), the sidewall of which length in the contacting direction is long. Thus, it is possible to lower a possibility that the sidewall of which length in the contacting direction is long might topple inward.

The printer 1 is configured such that the cartridge 30 configured as described above can be installed in the printer 1. Accordingly, in the printer 1, since the possibility that the tap 105 of the liquid container 100 might float or rise upward is reduced, the position of the tap 105 with respect to the lower case 37 becomes stable.

In the above-described embodiment, the cartridge 30 is an example of a "liquid storing cartridge". The lower case 37 is an example of a "casing". The front wall 31 is an example of a "first sidewall". The sidewall 366 is an example of a "second sidewall. The first contact part 366A and the second contact part 366B are each an example of a "contact part". The right wall 33 and the left wall 34 are each an example of a "third sidewall". The left wall 363 and the right wall 364 are each an example of a "fourth sidewall".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the liquid container 100 stores the ink, the liquid container 100 is not limited to this. For example, the liquid container 100 may store a liquid different from the ink. For example, the liquid container 100 may store a preservative liquid (storage liquid, shipping liquid) which is introduced to the ink tube 48 connecting the cartridge 30 and the ink-jet head 8 for a purpose of suppressing any solidification of the ink inside the ink tube 48, in a case that the printer 1 is shipped or in a case that the printer 1 is stored for a long period of time. In this case, it is allowable to adopt, as the preservative liquid, a liquid having such a property that the liquid is less likely to volatilize.

In the above-described embodiment, although the ink is, for example, the black ink, the ink is not limited to or restricted by this. For example, the ink may be an ink such as a cyan ink, a magenta ink, a yellow ink, a white ink or a clear ink, etc.

In the above-described embodiment, although the liquid container 100 has the shape of rectangular parallelepiped, the liquid container 100 is not limited to this. For example, the shape of the liquid container 100 may be a shape of another polyhedron, or may be cylindrical. Further, it is allowable that the liquid container 100 does not have a shape which is symmetrical in the front-rear direction In the above-described embodiment, although the tap 105 is provided on a position which is biased toward the left side surface 104 in the left-right direction, the arrangement of the tap 105 is not limited to this. For example, the tap 105 may be provided on a position which is biased toward the right side surface 103. In such a case, the installment part 7 of the first accommodating part 61 may be provided on a position corresponding to the arrangement position of the tap 105. Further, as the structure for preventing the sidewall from toppling inward, it is allowable to provide the rib on a certain sidewall without providing a cutout on a corresponding sidewall contacting the certain sidewall in a state that the cover 36 is closed, such that the inner surface of the corresponding sidewall is supported by the rib in a state that the inner surface of the corresponding sidewall is in direct contact with the rib.

What is claimed is:

1. A liquid storing cartridge for accommodating a liquid container which is configured to store a liquid and which has a container body and a tap, the liquid storing cartridge comprising:

a case having an opening configured to accommodate the liquid container, and a first sidewall being a plane; and a cover which is configured to cover at least part of the opening of the case, and which has a second sidewall being a plate, the first sidewall and the second sidewall defining a sidewall of the liquid storing cartridge in a state that the at least part of the opening of the case is covered by the cover and a part of an upper edge of the first sidewall and a part of a lower edge of the second sidewall are in contact with each other, wherein:

the upper edge of the first sidewall of the case is configured to support the tap in a state that the container body is accommodated in the opening;

the cover further has a contact part provided at the lower edge of the second sidewall;

the tap includes a connecting part, a supply port configured to supply the liquid in the liquid container to an outside of the liquid container, and a flat contact surface;

a first end of the connecting part is connected to the container body, and the supply port is defined at a second end, opposite to the first end, of the connecting part; and the contact part is configured to make contact with the flat contact surface of the tap at a position between the container body and the second end of the connecting part in a direction orthogonal to the sidewall of the liquid storing cartridge, in a state that the container body is accommodated in the opening, the at least part of the opening is covered by the cover, and the supply port at the second end of the connecting part is positioned outside of the liquid storing cartridge.

2. The liquid storing cartridge according to claim 1, wherein the contact part is a plurality of contact parts provided at the lower edge of the second sidewall of the cover; and each of the plurality of contact parts makes contact with the tap in a state that the at least part of the opening is covered by the cover.

3. The liquid storing cartridge according to claim 1, wherein the tap includes an inclined surface configured to guide the second sidewall of the cover to the first sidewall of the case.

4. The liquid storing cartridge according to claim 1, wherein:

the case further has a third sidewall;

the cover further has a fourth sidewall configured to make contact with the third sidewall in a state that the at least part of the opening of the case is covered by the cover;

one of the third and fourth sidewalls is shorter than other of the third and fourth sidewalls in a direction in which the third and fourth sidewalls are adjacent to each other in the state that the at least part of the opening of the case is covered by the cover; and a rib configured to support the other of the third and fourth sidewalls toward an outside of the liquid storing cartridge is provided on the one of the third and fourth sidewalls.

5. The liquid storing cartridge according to claim 1, wherein the contact part is constructed of a cutout formed by cutting out a part, of the second sidewall of the cover, in each of an up-down direction and a direction crossing the up-down direction.

6. The liquid storing cartridge according to claim 1, wherein the contact part is constructed of the lower edge, of the second sidewall of the cover, extending in a horizontal direction.

7. The liquid storing cartridge according to claim 1, wherein the tap includes a contact surface configured to make contact with the first sidewall of the case.

8. The liquid storing cartridge according to claim 1, wherein:

the case has a bottom wall;

the flat contact surface of the tap is configured to face, in a direction orthogonal to the bottom wall, away from the bottom wall, in a state that the liquid container is accommodated in the opening; and the contact part of the second sidewall is configured to make contact with the flat contact surface, in a state that the at least part of the opening is covered by the cover.

9. The liquid storing cartridge according to claim 8, wherein in the state that the liquid container is accommodated in the opening, and in a direction orthogonal to the bottom of the case, the flat contact surface of the tap is positioned more apart from the bottom wall than the supply port is.

10. The liquid storing cartridge according to claim 8, wherein:

the flat contact surface includes a first contact surface and a second contact surface;

in the state that the liquid container is accommodated in the opening and in a direction which extends within the first sidewall and which is parallel to the bottom wall, the supply port is positioned between the first contact surface and the second contact surface, and the contact part of the cover includes the first contact part and a second contact part configured to make contact with the first contact surface and the second contact surface, respectively, in the state that the at least part of the opening is covered by the cover.

11. The liquid storing cartridge according to claim 8, wherein:

the flat contact surface includes a first contact surface and a second contact surface, in the state that the liquid container is accommodated in the opening, and in a direction orthogonal to the bottom wall, the first contact surface and the second contact surface are positioned at heights different from each other; and the contact part of the cover includes the first contact part and a second contact part configured to make contact with the first contact surface and the second contact surface, respectively, in the state that the at least part of the opening is covered by the cover.

12. A printer comprising the liquid storing cartridge as defined in claim 1.

13. The liquid storing cartridge according to claim 1, wherein:

the case further has a third sidewall opposed to the first sidewall;

the cover further has a fourth sidewall opposed to the second sidewall; and the fourth sidewall is connected to the third sidewall such that the fourth sidewall is rotatable relative to the third sidewall about an axis extending in a direction in parallel with the sidewall and orthogonal to a direction in which the third and fourth sidewalls are adjacent to each other.

* * * * *